United States Patent [19]

Hilger

[11] Patent Number: 4,787,349
[45] Date of Patent: Nov. 29, 1988

[54] IGNITION DEVICE FOR AIR-COMPRESSING INTERNAL COMBUSTION ENGINE

[75] Inventor: Ulrich Hilger, Aachen, Fed. Rep. of Germany

[73] Assignee: Kloeckner-Humboldt-Deutz AG, Fed. Rep. of Germany

[21] Appl. No.: 96,896

[22] Filed: Sep. 14, 1987

[30] Foreign Application Priority Data

Sep. 16, 1986 [DE] Fed. Rep. of Germany ....... 3631473

[51] Int. Cl.$^4$ .............................................. H05B 3/00
[52] U.S. Cl. .................................. 123/297; 123/298; 123/145 A
[58] Field of Search .................. 123/298, 297, 145 A, 123/179 G, 543, 145 R, 43 R; 361/260, 266

[56] References Cited

U.S. PATENT DOCUMENTS

| 3,017,541 | 1/1962 | Lawson | 123/145 A |
| 3,373,724 | 3/1968 | Papst | 123/297 |
| 4,281,451 | 8/1981 | Mann | 123/145 A |
| 4,345,555 | 8/1982 | Oshima et al. | 123/145 A |
| 4,351,291 | 9/1982 | Mahanoy | 123/145 A |
| 4,477,717 | 10/1984 | Watson | 123/145 D |
| 4,556,781 | 12/1985 | Bauer | 123/145 A |
| 4,572,146 | 2/1986 | Grünwald et al. | 123/298 |
| 4,603,667 | 8/1986 | Grünwald et al. | 123/297 |
| 4,620,512 | 11/1986 | Brooks et al. | 123/145 A |
| 4,641,612 | 2/1987 | Chalke | 123/145 A |

Primary Examiner—Raymond A. Nelli
Attorney, Agent, or Firm—Charles L. Schwab

[57] ABSTRACT

An ignition device (2) for an air-compressing internal combustion engine which is cooled only to a small extent by the fuel which impacts upon it. As shown in FIG. 3, a heat reservoir in the form of at least one incandescent helix (15, 16) is inserted between an incandescent rod (6) and a casing (10) which surrounds the helix and the rod.

20 Claims, 5 Drawing Sheets

IGNITION DEVICE FOR AIR-COMPRESSING INTERNAL COMBUSTION ENGINE

TECHNICAL FIELD

This invention relates to an ignition device for an air-compressing internal combustion engine of the type having an injection nozzle in its cylinder head.

PRIOR ART STATEMENT

There is continuing interest in the use of alternative fuels for motor vehicles because of their long-term availability as well as supply certainty and cost. Methyl alcohol and ethyl alcohol have represented the alternative fuels best suited for use in vehicle engines and can be produced in many countries from locally available primary sources of energy such as natural gas and coal, as well as from bio-substances (biomass).

Because of their material characteristics, methyl alcohol and/or ethyl alcohol are the first choices for use in Otto cycle engines. However, the use of alcohol fuels in diesel engines is also sensible because of its high burning efficiency as well as the soot-free combustion which is typical of alcohol and the resulting considerably reduced particle emissions. As a result of the poor self-ignition characteristics of alcohols, however, measures must be taken to insure the ignition of the fuel/air mixture.

In the case of operation with pure alcohol, combustion is initiated by separate ignition. A procedure for separate ignition which has been known for some time is ignition on a hot surface (incandescent ignition); since methyl alcohol in particular, but also ethyl alcohol, ignite at relatively low surface temperatures. This procedure has been of considerable interest because it is possible, with relatively little expenditure, to adapt the diesel engine for surface ignition. In addition, incandescent ignition offers a high level of engine performance as well as a very favorable emission level.

DD-PS No. 39916 shows an air-compressing internal combustion engine in which the fuel is injected via an injection nozzle into the combustion chamber which has been formed in the piston. In order to ignite the mixture of fuel and air in the combustion chamber, an ignition device consisting of an incandescent rod or glow plug is provided with a casing which surrounds the respective heating element. Through the installation of a casing, complete cooling of the heating element by the fuel which comes into contact with it is supposed to be avoided. In spite of the shielding effect by the casing, severe cooling of the heating element does occur, caused by the fuel which enters through the inlet openings. In order to guarantee a surface temperature which is sufficiently high for providing reliable ignition of the fuel/air mixture, enough electrical energy must be consistently supplied to the heating element so a sufficient amount of heat is available for vaporizing and/or igniting the impacting streams of fuel. Additionally, the constant electrical heating of the heating elements considerably reduces their service life.

SUMMARY OF THE INVENTION

In using the ignition device of this invention an exceptionally small amount of electrical energy is needed for heating the heating element during operation of the internal combustion engine because of the provision of an incandescent body which functions as a heat reservoir. The incandescent body is inserted into the casing of the ignition device and advantageously increases the size of the surface upon which the fuel and air mixture can ignite. Substantial heating of the incandescent body occurs because of the combustion process occurring in the chamber within the casing. The incandescent body stores the heat supplied to it by the combustion process without great losses until the next ignition process; whereby ignition of the fuel/air mixture is possible at the incandescent body itself during a subsequent ignition process. Electrical heating of the ignition device via the heating element can therefore be greatly minimized. In addition to a decrease in electrical heating, significantly improved gas exhaust condition (low emissions of total hydrocarbons and carbon monoxide) is achieved, which can be attributed to the significant increase in the ignition surface, effected by the insertion of the incandescent body, and to improved incandescent ignition conditions.

Preferably, the incandescent body takes the form of an incandescent helix with multiple coils fabricated from, for example, high-temperature scaling-resistant chromium-nickel steel wire having a catalytic coating. The impacting of an alcohol fuel such as methyl alcohol on the incandescent body results in a catalytic splitting into gases such as CO and H2 which exhibit ignition temperatures which are significantly lower than that of the methyl alcohol itself. This catalytic effect thus leads to a reduction in the amount of electrical heating that needs to be applied to the ignition device heating element.

Preferably platinum or platinum alloys are used for fabricating the incandescent body. It may also be satisfactory to use a ceramic material with high thermal-conductivity which preferably has a catalytic coating. Especially when using a ceramic material, it is advantageous to design the incandescent body as a heavily perforated, hollow cylindrical insert. A sieve-like insert of this type can be easily fabricated from ceramic material.

The ignition device is preferably designed in such a way that two incandescent bodies can be incorporated for an additional expansion of the ignition surface.

It is advisable to design and/or equip the ignition device in such a way that fuel cannot directly impact on the incandescent body and the heating element, which together form the source of ignition. To this end an impact wall may be provided behind the fuel inlet opening, or the inlet opening can be positioned in such a way that the injected fuel impacts on the casing next to the inlet opening. In the latter case the fuel/gas mixture which is already ignition-ready enters through the inlet opening.

The ignition device of this invention can be used to advantage in an air-compressing internal combustion engine using fuel which resists self-ignition, such as methyl or ethyl alcohol used alone or in a mixture with other alcohols, gasoline or diesel fuel. In addition, the ignition device of this invention can be used as a starting accessory for internal combustion engines operating exclusively on self-ignition-ready fuel.

DETAILED DESCRIPTION OF THE DRAWINGS

Figure 1:
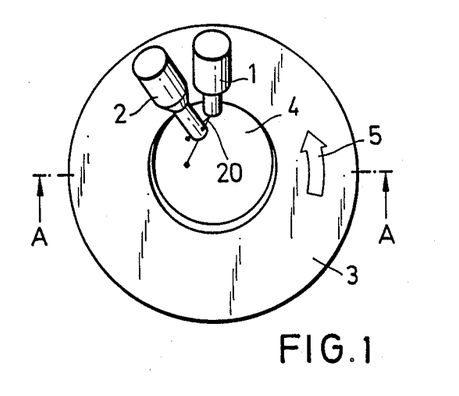
FIG. 1 is an overhead view showing an injection nozzle and the ignition device of this invention above a piston with a combustion chamber cavity.
Figure 2:
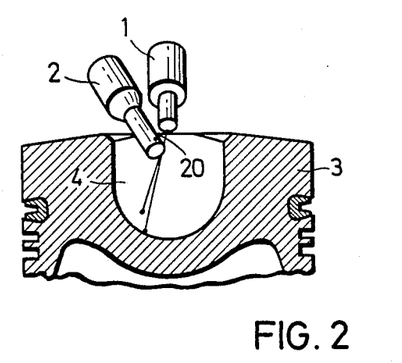
FIG. 2 is a view taken on the line A—A in FIG. 1.

FIGS. 1 and 2 show the general arrangement of an injection nozzle 1 as well as an ignition device 2 at an engine cylinder in which a piston 3 is disposed, the piston 3 having a chamber in the form of a bowl-shaped cavity 4. The combustion process is initiated by a fuel injector in the injection nozzle 1 mounted in the cylinder head and a high speed air swirl in the direction of arrow 5. The ignition device 2 is arranged in such a way next to the injection nozzle 1 that it lies in the direction of the air swirl 5 downstream of the injection nozzle 1 so a sufficient quantity of fuel is supplied to the ignition device 2 throughout the load and speed ranges of the internal combustion engine.

Figure 3:
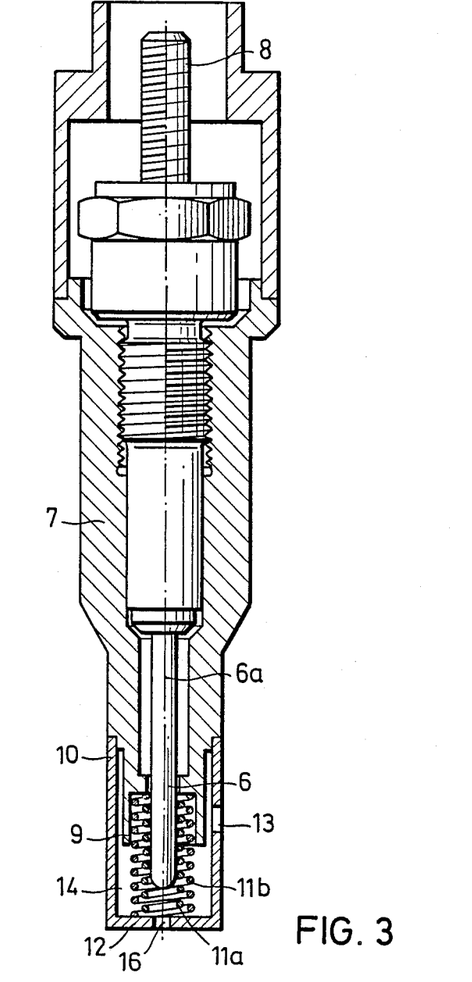
FIG. 3 is a section view of an ignition device representing one embodiment of this invention.

In the case of an engine design in which the injection occurs adjacent to the wall of the combustion chamber cavity, the injection device of FIG. 3 is especially advantageous because of an extensive shielding against the impact of great quantities of liquid fuel which is unavoidable with such a design and its attendant strong air swirl. A heating element in the form of an incandescent rod 6 extends from a holder 7 and is shielded by a casing 10 which is secured to holder 7. The casing 10 is substantially closed off at its bottom end from the combustion chamber cavity 4 by an end plate 12. The casing 10 surrounds or encompasses the incandescent rod 6 with a clearance on all sides.

Figure 7:
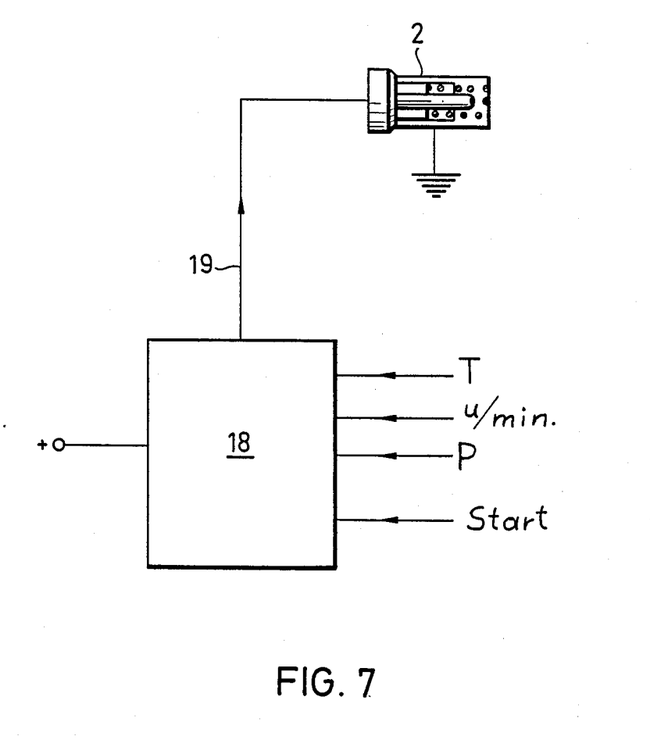
FIG. 7 is a block circuit diagram of an electrically heated ignition device.

The incandescent rod 6 has an inner electrical heating winding, not shown, to which electrical energy is supplied by a shielded electrical connection 8, and the necessary second electrical connection is formed by the holder 7 itself (as illustrated in FIG. 7). At least one incandescent body in the form of an incandescent helix is operatively disposed radially between the casing 10 and the incandescent rod 6 to serve as a heat reservoir. As illustrated in FIG. 3, two helixes 11a and 11b are provided which have first corresponding ends supported on the plate 12 of the casing 10 and have second corresponding ends supported on the holder 7. The first helix 11a fits snugly on the outer circumference of incandescent rod 6 and lies, as does the second helix 11b, coaxially with respect to axis 6a of the incandescent rod 6. By placing the helix closely adjacent to, or in contact with, the incandescent rod, good thermal conduction is guaranteed from the electrically heated incandescent rod 6 which serves as a heat reservoir to the incandescent body 11, and thus good incandescent ignition conditions are assured. The outer helix 11b surrounds the inner helix 11a with a predetermined radial clearance and its end portion which faces the holder 7 lies within a casing ring 9, which preferably is secured to the holder 7 and, as illustrated, may be a hollow cylindrical extension integrally formed on the bottom end of the holder 7. The casing ring 9 is arranged in such a way that it lies radially inward of the single fuel inlet opening 13 in the casing 10 and serves as an impact plate for a stream of injected fuel which enters directly through the inlet opening 13. In this embodiment (FIG. 3), the casing ring 9 covers approximately one-third to one-half of the axial length of the incandescent body (11a and 11b) and the inlet opening 13 lies approximately along one-half of the axial length of the casing ring 9.

With an arrangement of the ignition device of the type illustrated in FIGS. 1 and 2, at least one injection stream (preferably several injection streams) is provided for supplying fuel to the combustion chamber. In addition, an injection stream 20 is provided to ensure that a sufficient quantity of the ignitable mixture is delivered to the incandescent body 11 through the inlet opening 13. The axis of the round inlet opening 13 is approximately coaxial with the axis of the injection stream 20. The injection stream enters through the inlet opening 13 directly into the chamber 14 of the ignition device 2. The stream impacts on the casing ring 9 which serves as an impact wall, thereby avoiding a direct impacting of the fuel against the incandescent body (incandescent helixes 11a, 11b), which serves as a heat reservoir, and against the incandescent rod. Thus a major complete cooling off of the source of ignition is avoided. The rich fuel/air mixture which is formed is ignited on the hot surfaces of the helixes and the incandescent rod and is blown out through the inlet opening 13 because of the increase in pressure upon combustion. If necessary, one or more boreholes can be provided in the casing to provide better blowing-out of the ignited mixture. As shown in FIG. 3, an opening 16 in the plate 12 is provided which is coaxial with the axis 6a of the incandescent rod 6 and is positioned to direct the blow-out into the combustion chamber cavity 4. Preferably, the inlet opening 13 is larger than the plate opening 16. It has proven satisfactory to provide inlet opening 13 with a diameter of approximately 3 mm and one or more plate openings 16 (outlet opening) with a diameter of 0.5 to 1.0 mm. The burning mixture which escapes from the openings 13 and 16 serves to initiate ignition of the fuel/air mixture in the combustion chamber cavity 4.

Through the combustion in the chamber 14 as well as through the high gas temperatures in the combustion chamber cavity 4, the incandescent helixes 11a, 11b, which have from five to ten coils and which exhibit a low level of thermal inertia because of the small wire diameter of approximately 0.5 to 1.0 mm, are heated to temperatures of over 1,000 degrees C. in a short time period. The cooling-off of the incandescent helixes during the subsequent expansion and power stroke occurs so slowly because of the strong thermal insulating effect of casing 10 on the predominantly closed chamber 14 that of the surface temperature for igniting the fuel/air mixture is not reduced to such an extent that supplemental heating is required.

Figures 4, 5:
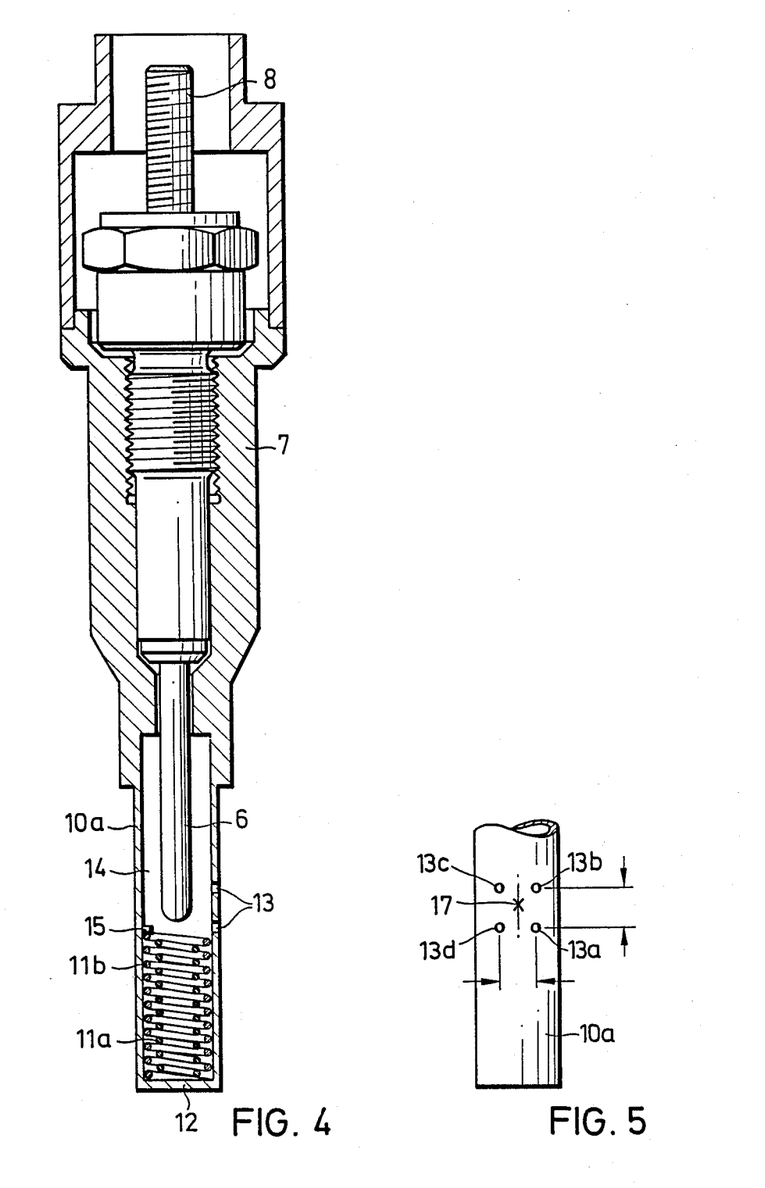
FIG. 4 is a section view of a second ignition device representing a second embodiment of this invention.
FIG. 5 is a view showing the fuel inlet openings in the casing of the ignition device of FIG. 4.

The ignition device per FIG. 4 is similar to the embodiment of FIG. 3. In a deviation from FIG. 3, the casing 10a is designed to be axially longer and the incandescent helixes 11a and 11b are disposed in the lower part of casing 10a between its bottom plate 12 and the incandescent rod 6. In this position, the lower ends of the incandescent helixes are supported on the plate 12 and the upper ends are supported on a collar or abutment 15 which is secured to the inside of the casing 10a just beneath the lower end of the incandescent rod 6. The incandescent rod 6 and the helixes 11a and 11b therefore do not ever directly contact each other. The coils of incandescent helixes 11a and 11b are positioned relative to one another in such a way that the inner incandescent helix 11a, which has a smaller diameter, fills in the interspace between the adjacent coils of the outer incandescent helix 11b when viewing the incandescent helix 11b in a radially inward direction.

Above the incandescent helixes 11a and 11b, near the free end of the incandescent rod 6, four inlet openings 13a, 13b, 13c, 13d are drilled in the casing 10a, as shown in the side view of FIG. 5, and are so positioned as to define the corners of a quadrilateral figure such as a square.

The ignition device of FIG. 4 is arranged in a combustion chamber in such a way that, for instance, during a spatially dispersed injection, an injection stream of the injection nozzle impacts on the casing 10a within the square defined by the inlet openings 13a to 13d at an impact point 17. This guarantees that no fuel is injected directly through the injection openings 13a to 13d. The fuel which does enter through the inlet openings 13a to 13d occurs predominantly in the form of a fuel/air mixture, which does not result in any severe cooling off of the incandescent helixes 11a, 11b or of the incandescent rod 6; thus, severe cooling is prevented. The entering fuel/air mixture is, as has already been described in connection with the embodiment of FIG. 3, ignited in the chamber 14 by means of surface ignition. The burning mixture is then blown out through the inlet boreholes 13a to 13d, whereby the injection streams delivered by the injector self-ignite.

It can be expedient to use the ignition device per FIG. 3 with an injector adjacent the combustion chamber wall or the ignition device per FIG. 4 with a centrally positioned injector. Preferably, the ignition devices of this invention are used in conjunction with an injection nozzle, which delivers an initial quantity of fuel for pilot injection before delivering the main quantity of fuel for primary injection.

Figure 6:
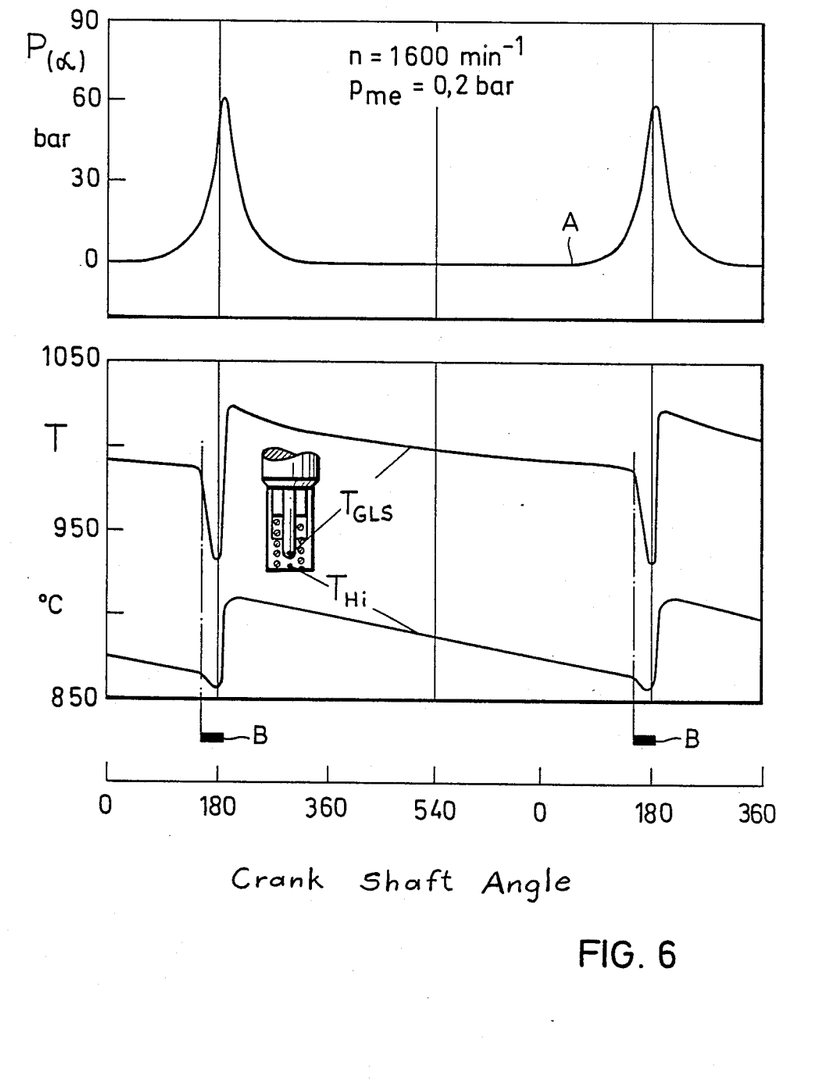
FIG. 6 is a diagram showing cylinder pressure and temperature plotted versus the crankshaft angle for an engine using the ignition device of this invention.

Referring to the representation of FIG. 6, we can see that by using the present invention in the ignition device 2 a temperature level can be maintained, without outside heating, which is sufficient for surface ignition. In the upper half of FIG. 6, the path of the cylinder pressure A is plotted versus the crank shaft angle. In the lower half of FIG. 6, the temperature $T_{GLS}$ at the free end of the incandescent rod 6 and the temperature $T_{Hi}$ approximately in the center of plate 12 are plotted versus the crank shaft angle. The cylinder pressure curve A exhibits two peaks which correspond to two sequential combustion processes in a cylinder. The temperature value is at its minimum value at the time the cylinder pressure is at its maximum because the injection (interval B) occurs at this point in time. Because of the cooling effect of the injected fuel, the ignition device 2 cools off a small amount, whereby values of about 950 degrees C. are maintained at the tip of the incandescent rod 6 and the values sof about 850 degrees C. are maintained at the plate 12. During the resulting combustion, the end of the incandescent rod 6 is heated to maximal temperatures of over 1000 degrees C. and the plate 12 to temperatures of about 900 degrees C. and these two elements gradually cool to a slight extent until the next injection interval B. The representation in FIG. 6 clearly shows that the heat-up of the ignition device occurs considerably faster than the subsequent cooling-off.

On the basis of this temperature behavior on the part of the ignition device 2, the supply of electrical heat to the rod 6 can be reduced to a minimum. To this end, a control mechanism 18, as shown in FIG. 7, is installed in the electrical supply line 19 for the ignition device 2. The control mechanism 18 includes sensors for picking up the characteristic data of the internal combustion engine, such as the actual speed (u/min), the torque load or power (P), temperature (T), etc. In addition, a start signal is provided.

When the start is signaled, the heating element is electrically heated at a high energy transmission rate to guarantee a rapid heating. If the engine is started (speed signal), the heating energy is reduced. In one use of the control mechanism, the heating element is steadily heated, after engine starting, at a low power rate (for instance, 20 to 60 watts). Such heating is maintained during all operating conditions of the internal combustion engine.

In another use of the control mechanism, the heat is turned off after the start of the internal combustion engine and only turned on if operating conditions make it necessary (change in engine load, for instance). The operational conditions may be determined using one or more sensed engine operating parameters.

In a combination with the indicated temperature of the internal combustion engine, the warm start can avoid the increase in heating which would be necessary with a cold start.

The ignition device of this invention distinguishes itself in its capability to operate with various fuels. Multivalent alcohols (energy alcohols) as well as gasoline or diesel fuel can be reliably ignited alone or in mixtures. The number and size of the openings in the casing 10a are adjusted depending on the installation, injection procedure and fuel. A sufficient quantity of air/fuel mixture and sufficiently hot surfaces of the helixes and the incandescent rod are provided for all load conditions.

The embodiments of the invention in which an exclusive property or privilege is claimed are defined as follows:

1. An ignition device for an air-compressing internal combustion engine of the type having an injection nozzle arranged in a cylinder head, said ignition device including an elongated heating element, a hollow casing having a cylindrical wall spaced from and surrounding a substantial part of the length of said element, thereby providing open space therebetween, said element being spaced radially inward from said cylindrical wall, a heat reservoir in the form of at least one incandescent body operatively disposed between said cylindrical wall of said casing and said heating element and occupying a minor part of said open space and an inlet opening in said cylindrical wall of said casing through which fuel enters into the hollow interior of said casing where it ignites and burns upon contact with said incandescent body.

2. The ignition device of claim 1 wherein said incandescent body coaxially surrounds said heating element over a portion of its length.

3. The ignition device of claim 2 wherein said incandescent body is an incandescent helix.

4. The ignition device of claim 3 wherein said incandescent helix includes at least five but not more than ten coils of wire having a diameter in the range of 0.5 to 1.0 mm.

5. The ignition device of claim 1 wherein said incandescent body is an incandescent helix.

6. The ignition device of claim 5 wherein said incandescent helix includes from five to ten coils of wire having a diameter of from 0.5 to 1.0 mm.

7. The ignition device of claim 1 wherein said incandescent body is a perforated, hollow cylindrical insert.

8. The ignition device of claim 7 wherein said incandescent body coaxially surrounds said heating element over a portion of its length.

9. The ignition device of claim 1 wherein said incandescent body is made of a high temperature scaling-resistant chromium-nickel steel.

10. The ignition device of claim 9 wherein said incandescent body has a catalytic coating.

11. The ignition device of claim 1 wherein said incandescent body has a catalytic coating.

12. The ignition device of claim 1 and further comprising a second inandescent body in telescopic relation to said one incandescent body.

13. The ignition device of claim 12 wherein said incandescent bodies and heating element are coaxial.

14. The ignition device of claim 12 wherein said incandescent bodies are incandescent helixes.

15. The ignition device of claim 12 wherein said incandescent bodies surround said heating element over a portion of its length.

16. The ignition device of claim 1 wherein said incandescent body is operable to ignite fuel.

17. The ignition device of claim 1 wherein said casing includes an impact wall disposed between said inlet opening and said incandescent body.

18. The ignition device of claim 17 wherein said inlet opening is aligned with the injection stream of said injection nozzle.

19. The ignition device of claim 1 wherein the injection stream of said injection nozzle impacts said casing near said inlet opening.

20. The ignition device of claim 1 and further comprising a control mechanism operatively connected to said heating element and operable to control the heat output of said heating element in response to operating parameters of said internal combustion engine.

* * * * *

UNITED STATES PATENT OFFICE
CERTIFICATE OF CORRECTION

Patent No. 4,787,349     Dated November 29, 1988

Inventor(s) Ulrich Hilger

It is certified that error appears in the above-identified patent and that said Letters Patent is hereby corrected as shown below:

The assignee should be corrected to read:

-- Prof. Dr. Franz Pischinger,

Fed. Rep. of Germany --.

Signed and Sealed this

Twentieth Day of June, 1989

*Attest:*

DONALD J. QUIGG

*Attesting Officer*     *Commissioner of Patents and Trademarks*